(12) United States Patent
Ikeda et al.

(10) Patent No.: US 12,730,455 B2
(45) Date of Patent: Sep. 8, 2026

(54) DISPLAY CONTROL DEVICE AND DISPLAY DEVICE

(71) Applicant: TOYOTA JIDOSHA KABUSHIKI KAISHA, Toyota (JP)

(72) Inventors: Keigo Ikeda, Nisshin (JP); Daiki Yokoyama, Miyoshi (JP); Yasuhiro Saito, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 34 days.

(21) Appl. No.: 18/786,094

(22) Filed: Jul. 26, 2024

(65) Prior Publication Data

US 2025/0093879 A1 Mar. 20, 2025

(30) Foreign Application Priority Data

Sep. 15, 2023 (JP) ................................ 2023-149686

(51) Int. Cl.

| | |
|---|---|
| ***G05D 1/224*** | (2024.01) |
| ***G05D 1/227*** | (2024.01) |
| ***G06T 7/00*** | (2017.01) |
| ***H04N 7/18*** | (2006.01) |

(52) U.S. Cl.

CPC ........... *G05D 1/2248* (2024.01); *G05D 1/227* (2024.01); *G06T 7/0002* (2013.01); *H04N 7/183* (2013.01); *G06T 2207/30168* (2013.01); *G06T 2207/30252* (2013.01)

(58) Field of Classification Search

CPC .. G05D 1/2248; G05D 1/227; G05D 2107/70; G05D 2109/10; G06T 7/0002; G06T 2207/30168; G06T 2207/30252; H04N 7/183; B60K 2360/139; B60K 2360/167; B60K 2360/175; B60K 2360/176; B60K 2360/21; B60K 2360/55; B60K 2360/566; B60K 35/28; B60K 2360/573; B60K 35/22

See application file for complete search history.

(56) References Cited

U.S. PATENT DOCUMENTS

2017/0320529 A1 11/2017 Nordbruch
2021/0133947 A1* 5/2021 Li ......................... G01S 17/931
2021/0197808 A1* 7/2021 Maeda .................. B60W 40/04

FOREIGN PATENT DOCUMENTS

JP 2004-291186 A 10/2004
JP 2017-538619 A 12/2017
JP 2019-106674 A 6/2019
JP 2020-048013 A 3/2020

* cited by examiner

*Primary Examiner* — Anne Marie Antonucci
*Assistant Examiner* — Luis G Del Valle
(74) *Attorney, Agent, or Firm* — Sughrue Mion, PLLC

(57) ABSTRACT

A display control device includes one of a mounting acquisition unit and an image quality acquisition unit, and a display controller, in which the display controller is configured to display a mounted camera image on a display screen in one of a case where a mounted camera is mounted in a moving object and a case where an image quality is equal to or more than a criterion, and display an external camera image on the display screen in one of a case where the mounted camera is not mounted in the moving object and a case where the image quality is less than the criterion.

10 Claims, 8 Drawing Sheets

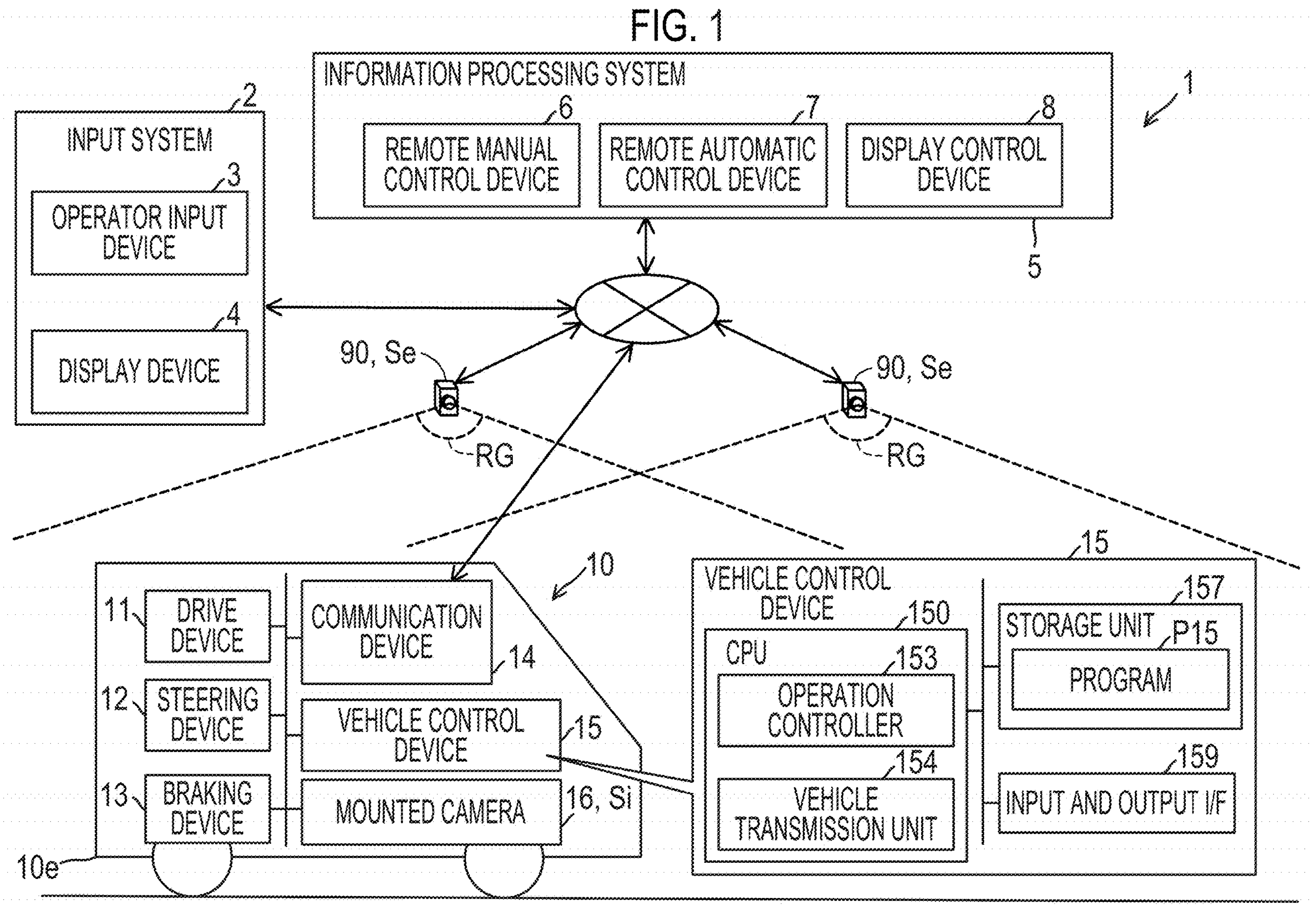
FIG. 1
INFORMATION PROCESSING SYSTEM
1
6
REMOTE MANUAL CONTROL DEVICE
7
REMOTE AUTOMATIC CONTROL DEVICE
8
DISPLAY CONTROL DEVICE
5
2
INPUT SYSTEM
3
OPERATOR INPUT DEVICE
4
DISPLAY DEVICE
90, Se
RG
90, Se
RG
10
11
DRIVE DEVICE
12
STEERING DEVICE
13
BRAKING DEVICE
COMMUNICATION DEVICE
14
VEHICLE CONTROL DEVICE
15
MOUNTED CAMERA
16, Si
10e
15
VEHICLE CONTROL DEVICE
150
CPU
153
OPERATION CONTROLLER
154
VEHICLE TRANSMISSION UNIT
157
STORAGE UNIT
P15
PROGRAM
159
INPUT AND OUTPUT I/F

Figure 5:
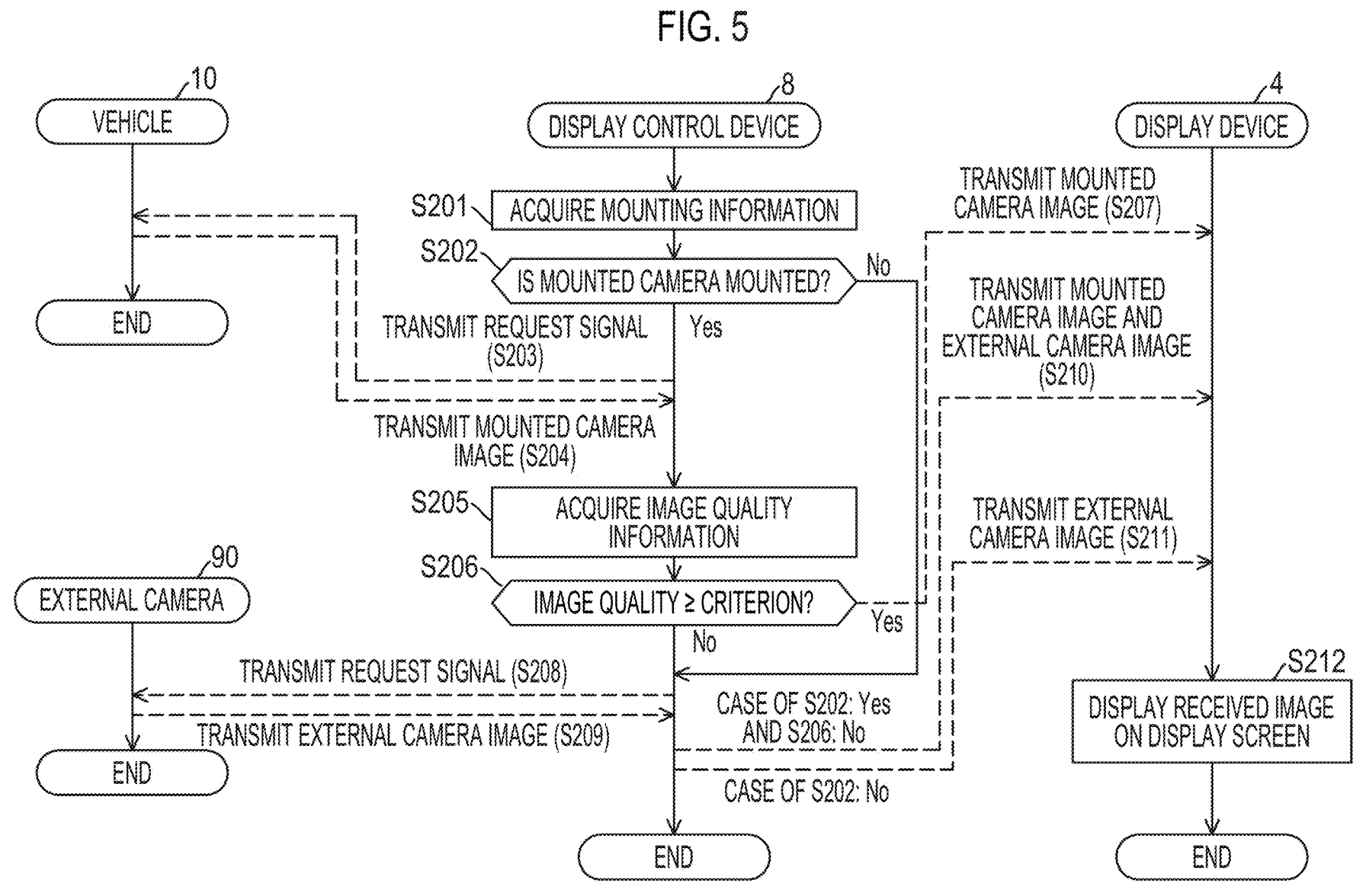

10 VEHICLE

END

8 DISPLAY CONTROL DEVICE

S201 ACQUIRE MOUNTING INFORMATION

S202 IS MOUNTED CAMERA MOUNTED?

Yes

No

TRANSMIT REQUEST SIGNAL (S203)

TRANSMIT MOUNTED CAMERA IMAGE (S204)

S205 ACQUIRE IMAGE QUALITY INFORMATION

S206 IMAGE QUALITY ≥ CRITERION?

Yes

No

CASE OF S202: Yes AND S206: No

CASE OF S202: No

END

90 EXTERNAL CAMERA

TRANSMIT REQUEST SIGNAL (S208)

TRANSMIT EXTERNAL CAMERA IMAGE (S209)

END

4 DISPLAY DEVICE

TRANSMIT MOUNTED CAMERA IMAGE (S207)

TRANSMIT MOUNTED CAMERA IMAGE AND EXTERNAL CAMERA IMAGE (S210)

TRANSMIT EXTERNAL CAMERA IMAGE (S211)

S212 DISPLAY RECEIVED IMAGE ON DISPLAY SCREEN

END

FIG. 6

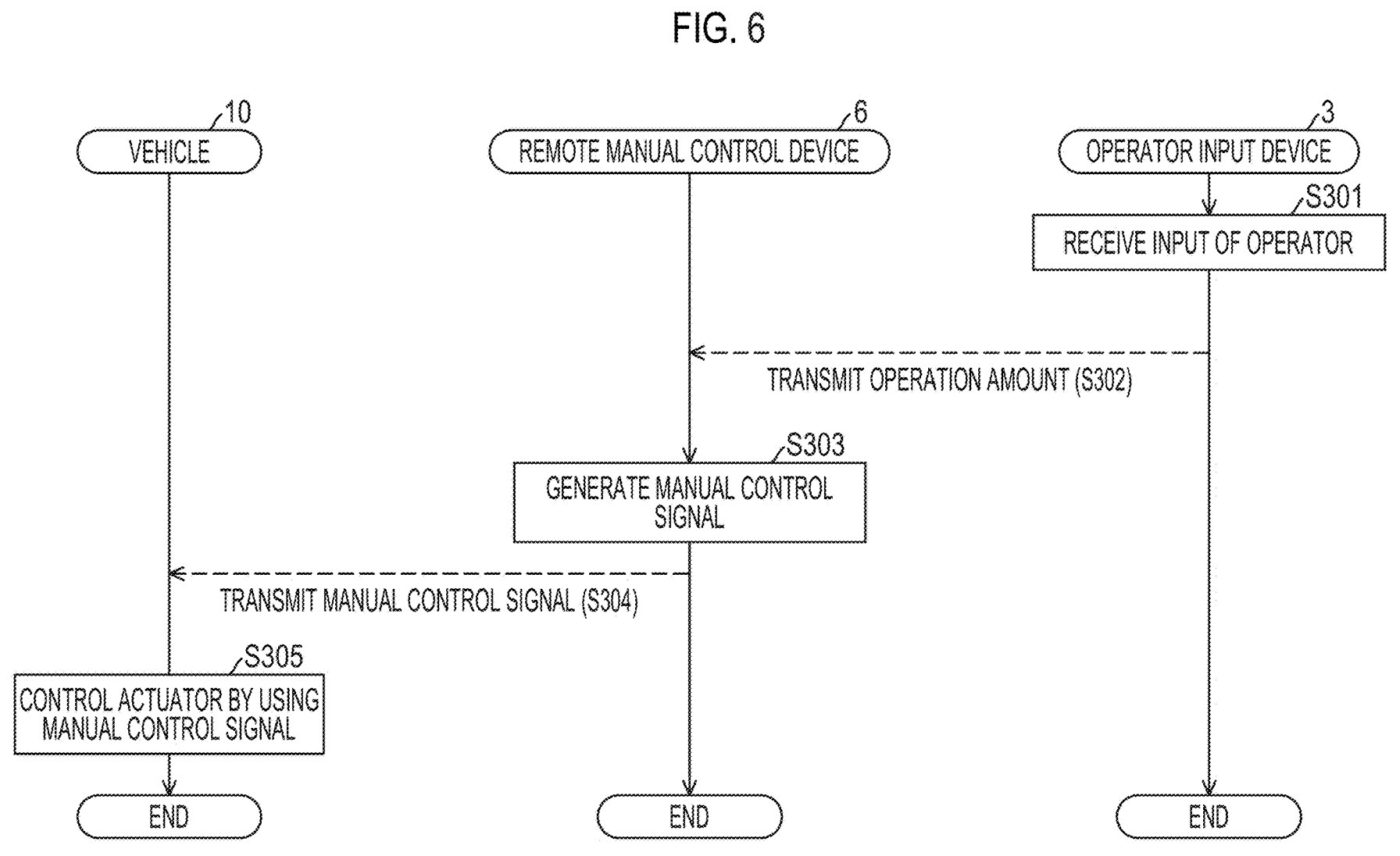

OPERATOR INPUT DEVICE 3

RECEIVE INPUT OF OPERATOR S301

TRANSMIT OPERATION AMOUNT (S302)

END

REMOTE MANUAL CONTROL DEVICE 6

GENERATE MANUAL CONTROL SIGNAL S303

TRANSMIT MANUAL CONTROL SIGNAL (S304)

END

VEHICLE 10

CONTROL ACTUATOR BY USING MANUAL CONTROL SIGNAL S305

END

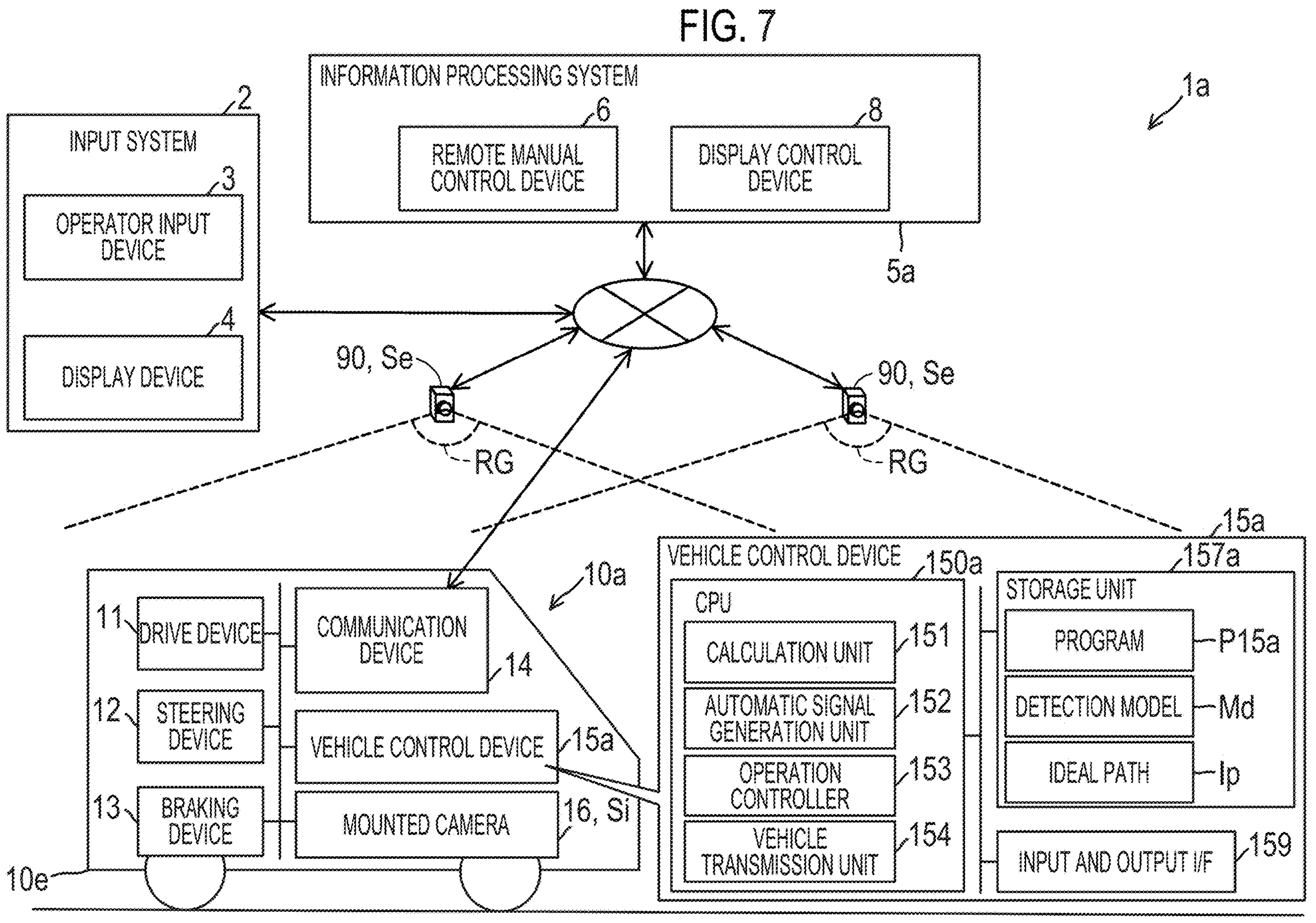

FIG. 7
1a
INFORMATION PROCESSING SYSTEM
6
REMOTE MANUAL CONTROL DEVICE
8
DISPLAY CONTROL DEVICE
5a
2
INPUT SYSTEM
3
OPERATOR INPUT DEVICE
4
DISPLAY DEVICE
90, Se
RG
90, Se
RG
10a
11
DRIVE DEVICE
12
STEERING DEVICE
13
BRAKING DEVICE
COMMUNICATION DEVICE
14
VEHICLE CONTROL DEVICE
15a
MOUNTED CAMERA
16, Si
10e
15a
VEHICLE CONTROL DEVICE
150a
CPU
CALCULATION UNIT
151
AUTOMATIC SIGNAL GENERATION UNIT
152
OPERATION CONTROLLER
153
VEHICLE TRANSMISSION UNIT
154
157a
STORAGE UNIT
PROGRAM
P15a
DETECTION MODEL
Md
IDEAL PATH
Ip
INPUT AND OUTPUT I/F
159

DISPLAY CONTROL DEVICE AND DISPLAY DEVICE

CROSS-REFERENCE TO RELATED APPLICATION

This application claims priority to Japanese Patent Application No. 2023-149686 filed on Sep. 15, 2023, incorporated herein by reference in its entirety.

BACKGROUND

1. Technical Field

The present disclosure relates to a display control device and a display device.

2. Description of Related Art

In the related art, a vehicle autonomously driven by remote control is known (Japanese Unexamined Patent Application Publication (Translation of PCT Application) No. 2017-538619 (JP 2017-538619 A)).

SUMMARY

In a case where a moving object, such as a vehicle, is stopped or the like in a period during which control of autonomous driving is executed, the moving object may be remotely controlled by an operator who operates an operator input device provided at a different place from the moving object. In this case, a technique is desired in which the operator can visually recognize an image indicating a surrounding situation of the moving object in order to operate the operator input device.

The present disclosure can be implemented as the following forms.

A first aspect of the present disclosure relates to a display control device. In the display control device configured to control a display device used to move a moving object configured to move via unmanned driving, the moving object is configured to receive a traveling control signal that defines a traveling operation of the moving object and is generated in response to an operation performed by an operator on an operator input device provided at a different place from the moving object, and travel in a remote manual driving mode by using the received traveling control signal. In a period during which control of the remote manual driving mode is executed, the traveling control signal is generated in response to the operation performed by the operator on the operator input device using an image acquired by a camera and displayed on a display screen of the display device provided at a different place from the moving object. The camera is at least one of a mounted camera mounted in the moving object or an external camera configured to image the moving object from an outside. The display control device incudes at least one of a mounting acquisition unit or an image quality acquisition unit, and a display controller. The mounting acquisition unit is configured to acquire mounting information indicating whether or not the mounted camera is mounted in the moving object. The image quality acquisition unit is configured to acquire image quality information indicating an image quality of a mounted camera image that is the image acquired by the mounted camera. The display controller is configured to display the image on the display screen. The display controller is configured to display the mounted camera image on the display screen in at least one of a case where the mounted camera is mounted in the moving object and a case where the image quality is equal to or more than a predetermined criterion, and display an external camera image that is the image acquired by the external camera, provided at a different place from the moving object, on the display screen in at least one of a case where the mounted camera is not mounted in the moving object and a case where the image quality is less than the criterion. According to the first aspect of the present disclosure, the display control device can display at least one of the mounted camera image and the external camera image on the display screen in accordance with the mounting information and the image quality information. That is, in a case where the operator operates the operator input device to remotely control the moving object, the display control device can provide an image showing a surrounding situation of the moving object to the operator.

In the first aspect of the present disclosure, the image quality may be determined by at least any one of a resolution of the mounted camera image, a distortion of the mounted camera image, and a detection range of the mounted camera. According to the first aspect of the present disclosure, the image quality of the mounted camera image can be determined by at least any one of the resolution of the mounted camera image, the distortion of the mounted camera image, and the detection range of the mounted camera that acquires the mounted camera image.

In the first aspect of the present disclosure, the display controller may be configured to determine that the image quality is equal to or more than the criterion in at least any one of a first case, a second case, and a third case, the first case being a case where the resolution of the mounted camera image is equal to or more than a first threshold value, the second case being a case where the distortion of the mounted camera image is less than a predetermined second threshold value, and the third case being a case where the detection range of the mounted camera is equal to or more than a predetermined third threshold value.

In the first aspect of the present disclosure, the moving object may be further configured to travel in an automated driving mode by using the traveling control signal generated without responding to the operation performed by the operator on the operator input device, the display controller may be configured to display at least one of the mounted camera image and the external camera image on the display screen in accordance with the mounting information and the image quality information in at least any one of a case where the automated driving mode is switched to the remote manual driving mode and a case where the switching from the automated driving mode to the remote manual driving mode is predicted. According to the first aspect of the present disclosure, the display control device can display at least one of the mounted camera image and the external camera image on the display screen in accordance with the mounting information and the image quality information in a case where the automated driving mode is switched to the remote manual driving mode. In this way, the display control device can provide the image indicating the surrounding situation of the moving object to the operator in the period during which the control of the remote manual driving mode is executed. According to the first aspect of the present disclosure, the display control device can display at least one of the mounted camera image and the external camera image on the display screen in accordance with the mounting information and the image quality information in a case where the switching from the automated driving mode to the remote manual driving mode is predicted. In this way, the display control device can provide the image indicating the surrounding situation of the moving object to the operator before the automated driving mode is switched to the remote manual driving mode. Therefore, the display control device can allow the operator to start the operation of the operator input device promptly by allowing the operator to visually recognize the image displayed on the display screen in a case where the automated driving mode is switched to the remote manual driving mode.

In the first aspect of the present disclosure, the display controller may be configured to display at least one of the mounted camera image and the external camera image on the display screen in accordance with the mounting information and the image quality information even in a period during which control of the automated driving mode is executed.

In the first aspect of the present disclosure, the display controller may be configured to, when the display controller displays the mounted camera image on the display screen, display the external camera image on the display screen in addition to the mounted camera image. According to the first aspect of the present disclosure, in a case where the mounted camera image is displayed on the display screen, the display control device can display the external camera image on the display screen in addition to the mounted camera image. In this way, the display control device can provide the external camera image that can be visually recognized with to the operator in a situation of a region that cannot be visually recognized with the mounted camera image.

A second aspect of the present disclosure relates to a display device. In the display device used to move a moving object configured to move via unmanned driving, the moving object is configured to receive a traveling control signal that defines a traveling operation of the moving object and is generated in response to an operation performed by an operator on an operator input device provided at a different place from the moving object, and travel in a remote manual driving mode by using the received traveling control signal. The display device includes a display screen provided at a different place from the moving object and on which an image acquired by a camera is displayed. In a period during which control of the remote manual driving mode is executed, the traveling control signal is generated in response to the operation performed by the operator on the operator input device using the image displayed on the display screen. The camera is at least one of a mounted camera mounted in the moving object or an external camera configured to image the moving object from an outside. A mounted camera image that is the image acquired by the mounted camera is displayed on the display screen in at least one of a case where the mounted camera is mounted in the moving object and a case where an image quality of the mounted camera image is equal to or more than a predetermined criterion, and an external camera image that is the image acquired by the external camera that is provided at a different place from the moving object, is displayed on the display screen in at least one of a case where the mounted camera is not mounted in the moving object and a case where the image quality is less than the criterion. According to the second aspect of the present disclosure, the display device can display at least one of the mounted camera image and the external camera image on the display screen depending on whether or not the mounted camera is mounted in the moving object, and the image quality of the mounted camera image. That is, in a case where the operator operates the operator input device to remotely control the moving object, the display device can provide the image showing the surrounding situation of the moving object to the operator.

The present disclosure can be implemented in various forms other than the display control device and the display device described above. For example, the present disclosure can be implemented in forms of a display system including a display control device and a display device, a method of manufacturing a display control device and a display device, a method of controlling a display control device and a display device, a computer program that implements the method of controlling the display control device and the display device, a non-transitory recording medium that records the computer program, and the like.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a diagram illustrating a configuration of a traveling system in a first embodiment;

FIG. 4 is a flowchart illustrating an operation control method of a vehicle in an automated driving mode;

FIG. 5 is a flowchart illustrating a display control method of a display screen in a remote manual driving mode;

FIG. 6 is a flowchart illustrating an operation control method of the vehicle in the remote manual driving mode;

FIG. 7 is a diagram illustrating a configuration of a traveling system in a second embodiment.

DETAILED DESCRIPTION OF EMBODIMENTS

A. First Embodiment

Figure 2:
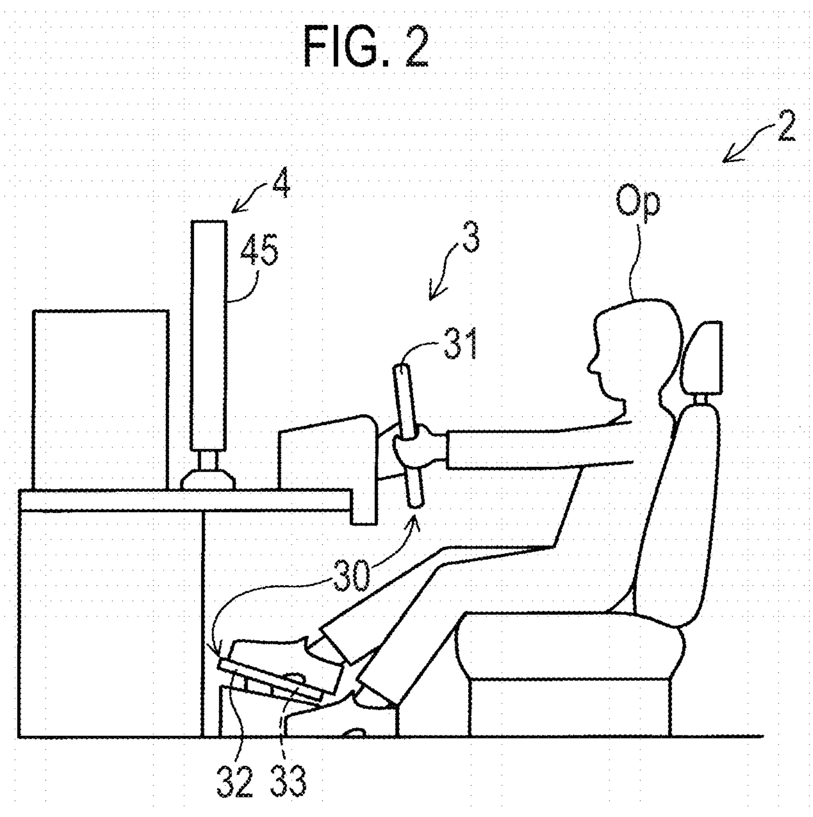
FIG. 2 is a diagram illustrating a configuration of an input system.

FIG. 1 is a diagram illustrating a configuration of a traveling system 1 in a first embodiment. The traveling system 1 is a system for causing a moving object to travel without steering performed by an occupant who gets in the moving object. The traveling system 1 includes one or more moving objects, an external camera 90, an input system 2 including an operator input device 3 and a display device 4, and an information processing system 5 including a remote manual control device 6, a remote automatic control device 7, and a display control device 8.

The "moving object" means an object that can be moved, for example, a vehicle 10 or an electric vertical take-off and landing aircraft (so-called flying car). In the present embodiment, the moving object is the vehicle 10. The vehicle 10 may be a vehicle that travels using wheels or a vehicle that travels using a caterpillar, and is, for example, a passenger car, a truck, a bus, a two-wheeled vehicle, a four-wheeled vehicle, a tank, and a construction vehicle. The vehicle 10 includes a battery electric vehicle (BEV), a gasoline vehicle, a hybrid electric vehicle, and a fuel cell electric vehicle. In addition, in a case where the moving object is other than the vehicle 10, the expression of "vehicle" and "car" in the present disclosure can be replaced with "moving object" as appropriate, and the expression of "travel" can be replaced with "move" as appropriate.

The vehicle 10 includes a drive device 11, a steering device 12, a braking device 13, a communication device 14, and a vehicle control device 15. The drive device 11 accelerates the vehicle 10. The steering device 12 changes a traveling direction of the vehicle 10. The braking device 13 decelerates the vehicle 10. The communication device 14 communicates with an external device through wireless communication or the like. The external device is another device, such as the remote manual control device 6, and another vehicle 10. The communication device 14 is, for example, a wireless communication device. The vehicle control device 15 controls an operation of the vehicle 10.

The vehicle control device 15 includes an input and output interface 159, a storage unit 157, and a central processing unit (CPU) 150. The input and output interface 159 is used to communicate with various devices mounted in the vehicle 10 that is the host vehicle. The storage unit 157 of the vehicle control device 15 stores various kinds of information including various programs P15 for controlling an operation of the vehicle control device 15. The CPU 150 of the vehicle control device 15 functions as an operation controller 153 and a vehicle transmission unit 154 by loading various programs P15 stored in the storage unit 157. The operation controller 153 executes a driving control of the vehicle 10 by controlling an operation of an actuator that changes the acceleration and deceleration and a steering angle of the vehicle 10. The “driving control” means, for example, various controls, such as adjustment of the acceleration, the speed, the steering angle, and the like of the vehicle 10, for driving the actuator that exhibits three functions of “traveling”, “turning”, and “stopping” of the vehicle 10. In the present embodiment, the actuator includes an actuator of the drive device 11, an actuator of the steering device 12, and an actuator of the braking device 13. The vehicle transmission unit 154 transmits a mounted camera image described later to the display control device 8 in response to a request from the display control device 8.

The configuration of the vehicle 10 is not limited to the above-described configuration. The vehicle 10 may further include a mounted camera 16 as a camera mounted in the vehicle 10. In a case where the vehicle 10 includes one mounted camera 16, the mounted camera 16 is mounted in a front side of the vehicle 10 such that the mounted camera 16 can image a landscape in front of the vehicle 10.

The vehicle 10 can travel via the unmanned driving. The “unmanned driving” means driving that does not depend on the driving operation of the occupant. The driving operation means an operation related to at least any one of “traveling”, “turning”, and “stopping” of the vehicle 10. The unmanned driving is implemented by an automatic or manual remote control using a device provided outside the vehicle 10 or an autonomous control of the vehicle 10. The occupant who does not execute the driving operation may get in the vehicle 10 that travels by the unmanned driving. Examples of the occupant who does not execute the driving operation include a person who simply sits in a seat of the vehicle 10 and a person who executes work different from the driving operation, such as assembly, inspection, or operation of switches, while getting in the vehicle 10. In addition, the driving with the driving operation of the occupant may be referred to as “manned driving”.

In the present embodiment, the vehicle 10 travels within a factory in which the vehicle 10 is manufactured, in any one of a remote manual driving mode and an automated driving mode. In the remote manual driving mode, the vehicle 10 receives a traveling control signal (hereinafter, referred to as a manual control signal) that defines a traveling operation of the vehicle 10 and is generated in response to an operation performed by an operator on the operator input device 3 from an outside. Therefore, the vehicle 10 travels by using the received manual control signal. In the automated driving mode, the vehicle 10 receives the traveling control signal (hereinafter, an automatic control signal) generated without responding to the operation performed by the operator from the outside. Therefore, the vehicle 10 travels by using the received automatic control signal. For example, in a period during which the control of the automated driving mode is executed, when the vehicle 10 is unexpectedly stopped even though the vehicle 10 receives the automatic control signal, the driving mode of the vehicle 10 is switched from the automated driving mode to the remote manual driving mode. The vehicle 10 may travel in a different place from the factory.

The external camera 90 is a camera provided at a different place from the vehicle 10. An installation position and an orientation of the external camera 90, and the number of the installed external cameras 90 are decided in consideration of a detection range RG (angle of view) of the external camera 90. In the present embodiment, the external camera 90 is a camera installed in the factory. The external camera 90 images the detection range RG including the vehicle 10 from the outside of the vehicle 10. Therefore, the external camera 90 outputs the image (hereinafter, referred to as an external camera image) as the detection result.

FIG. 2 is a diagram illustrating a configuration of the input system 2. The input system 2 is a system for an operator Op to remotely control the traveling operation of the vehicle 10 from a different place from the vehicle 10. As described above, the input system 2 includes the operator input device 3 and the display device 4.

The operator input device 3 is an input device for the operator Op to remotely control the traveling operation of the vehicle 10. The operator input device 3 is provided at a different place from the vehicle 10. The operator input device 3 is connected to the remote manual control device 6 in a communicable manner. The operator input device 3 includes one or more input operation units 30 operated by the operator Op. In the present embodiment, the operator input device 3 includes a steering wheel 31, an accelerator pedal 32, and a brake pedal 33 as the input operation units 30. The steering wheel 31 changes the traveling direction of the vehicle 10 via the remote control. The accelerator pedal 32 accelerates the vehicle 10 via the remote control. The brake pedal 33 decelerates the vehicle 10 via the remote control. The configuration of the operator input device 3 is not limited to the above-described configuration. The operator input device 3 may include, for example, a push button switch or a lever switch as the input operation unit 30.

The display device 4 is used for the traveling of the vehicle 10. Specifically, the display device 4 is used for the operator Op to visually recognize the surrounding situation of the vehicle 10 as a control target when the operator Op operates the operator input device 3. The display device 4 is provided at a different place from the vehicle 10. The display device 4 is connected to the display control device 8 in a communicable manner. The display device 4 includes a display screen 45. The display screen 45 displays the images acquired by the cameras 16, 90 that include at least a surrounding region of the vehicle 10 as the control target in the detection range RG. The display device 4 is disposed at a position at which the operator Op can visually recognize the display screen 45. The operator Op operates the operator input device 3 using the image displayed on the display screen 45 in a period during which control of the remote manual driving mode is executed.

Figure 3:
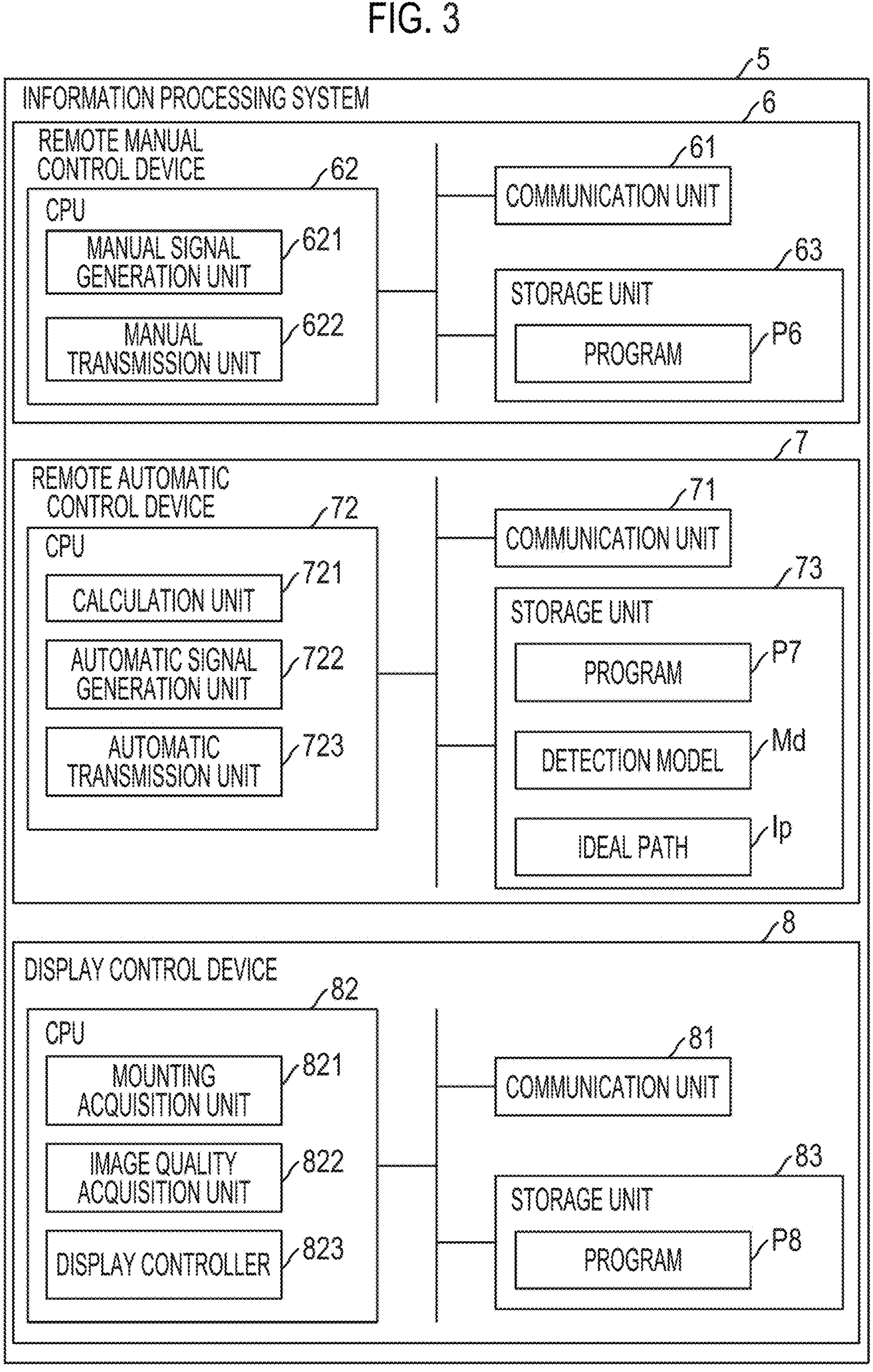
FIG. 3 is a diagram illustrating a configuration of an information processing system.

FIG. 3 is a diagram illustrating a configuration of the information processing system 5. As described above, the information processing system 5 includes the remote manual control device 6, the remote automatic control device 7, and the display control device 8. The function of the information processing system 5 is implemented by, for example, a server.

The remote manual control device 6 generates the manual control signal, and transmits the generated manual control signal to the vehicle 10 as the control target. The remote manual control device 6 includes a communication unit 61, a storage unit 63, and a CPU 62. The communication unit 61, the storage unit 63, and the CPU 62 in the remote manual control device 6 are connected to each other, for example, via an internal bus.

The communication unit 61 of the remote manual control device 6 is connected to another device other than the remote manual control device 6 and the remote manual control device 6 in a communicable manner. The communication unit 61 of the remote manual control device 6 is, for example, a wireless communication device.

The storage unit 63 of the remote manual control device 6 stores various kinds of information including various programs P6 for controlling the operation of the remote manual control device 6. The storage unit 63 of the remote manual control device 6 includes, for example, a random-access memory (RAM), a read-only memory (ROM), and a hard disk drive (HDD).

The CPU 62 of the remote manual control device 6 functions as a manual signal generation unit 621 and a manual transmission unit 622 by loading various programs P6 stored in the storage unit 63. The manual signal generation unit 621 generates the manual control signal. In the present embodiment, the manual control signal includes the acceleration and the steering angle of the vehicle 10 as parameters. The manual transmission unit 622 transmits the manual control signal to the vehicle 10 as the control target. Therefore, the vehicle control device 15 mounted in the vehicle 10 receives the manual control signal from the remote manual control device 6 and drives the actuator by using the received manual control signal, so that the vehicle 10 travels in response to the operation performed by the operator Op on the operator input device 3.

The remote automatic control device 7 generates the automatic control signal, and transmits the generated automatic control signal to the vehicle 10 as the control target. The remote automatic control device 7 includes a communication unit 71, a storage unit 73, and a CPU 72. The communication unit 71, the storage unit 73, and the CPU 72 in the remote automatic control device 7 are connected to each other via, for example, an internal bus.

The communication unit 71 of the remote automatic control device 7 is connected to another device other than the remote automatic control device 7 and the remote automatic control device 7 in a communicable manner. The communication unit 71 of the remote automatic control device 7 is, for example, a wireless communication device.

The storage unit 73 of the remote automatic control device 7 stores various kinds of information including various programs P7 for controlling the operations of the remote automatic control device 7, a detection model Md, and an ideal path Ip. The details of the detection model Md and the ideal path Ip will be described later. The storage unit 63 of the remote automatic control device 7 includes, for example, a RAM, a ROM, and a hard disk drive (HDD).

The CPU 72 of the remote automatic control device 7 functions as a calculation unit 721, an automatic signal generation unit 722, and an automatic transmission unit 723 by loading various programs P7 stored in the storage unit 73.

The calculation unit 721 calculates a position of the vehicle 10. In the present embodiment, the calculation unit 721 calculates the position of the vehicle 10 by using the external camera image output from the external camera 90 as an external sensor Se provided at a different place from the vehicle 10. The calculation unit 721 calculates coordinates of a positioning point 10*e* of the vehicle 10 in an image coordinate system by using, for example, an appearance shape of the vehicle 10 detected from the external camera image. Then, the calculation unit 721 calculates the position of the vehicle 10 by transforming the calculated coordinates into coordinates in a global coordinate system. In the present embodiment, the position information of the vehicle 10 includes coordinates of X, Y, and Z in the global coordinate system of the factory.

The appearance shape of the vehicle 10 included in the external camera image can be detected, for example, by inputting the external camera image to the detection model Md using artificial intelligence. Examples of the detection model Md include a trained machine learning model that has been trained to implement any one of semantic segmentation and instance segmentation. As the detection model Md, for example, a convolutional neural network (CNN) that has been trained through supervised learning using a training data set can be used. The training data set includes, for example, a plurality of training images including the vehicle 10 and a correct answer label indicating whether each region in the training image is a region indicating the vehicle 10 or a region indicating a region other than the vehicle 10. When the CNN is trained, the parameters of the CNN are preferably updated by backpropagation (error backpropagation method) to reduce an error between the output result of the detection model Md and the correct answer label.

The calculation unit 721 may further calculate the orientation of the vehicle 10. The orientation of the vehicle 10 can be calculated based on, for example, an orientation of a movement vector of the vehicle 10 calculated from a positional change in a feature point of the vehicle 10 between frames of the external camera image, by using an optical flow method. The orientation of the vehicle 10 may be calculated, for example, by using an output result of a yaw rate sensor or the like mounted in the vehicle 10. The calculation unit 721 may be a single function of another device other than the remote automatic control device 7, such as the external camera 90. In this case, the remote automatic control device 7 includes an acquisition unit that acquires the position information of the vehicle 10, instead of the calculation unit 721.

The automatic signal generation unit 722 generates the automatic control signal. The automatic signal generation unit 722 first decides a target position to which the vehicle 10 should head next, in order to generate the automatic control signal. In the present embodiment, the target position is represented by the coordinates of X, Y, and Z in the global coordinate system of the factory. The automatic signal generation unit 722 decides the target position to which the vehicle 10 should head next, by using the position information of the vehicle 10 and the ideal path Ip stored in advance in the storage unit 73 of the remote automatic control device 7. The ideal path Ip is a path on which the vehicle 10 should travel. The path is represented by a node indicating a departure point, a node indicating a passing point, a node indicating a destination, and a link connecting the respective nodes. The automatic signal generation unit 722 decides the target position on the ideal path Ip ahead of a current position of the vehicle 10. The automatic signal generation unit 722 generates the automatic control signal for causing the vehicle 10 to travel toward the decided target position. The automatic signal generation unit 722 calculates a traveling speed of the vehicle 10 from the transition of the position of the vehicle 10, and compares the calculated traveling speed with a predetermined target speed of the vehicle 10. The automatic signal generation unit 722 decides the acceleration to accelerate the vehicle 10 when the traveling speed is lower than the target speed, and decides the acceleration to decelerate the vehicle 10 when the traveling speed is higher than the target speed. The automatic signal generation unit 722 decides the steering angle such that the vehicle 10 does not deviate from the ideal path Ip in a case where the vehicle 10 is located on the ideal path Ip, and decides the steering angle such that the vehicle 10 returns to the ideal path Ip in a case where the vehicle 10 is not located on the ideal path Ip, in other words, in a case where the vehicle 10 deviates from the ideal path Ip. In this way, the automatic signal generation unit 722 generates the traveling control signal including the acceleration and the steering angle of the vehicle 10 as the parameters.

The automatic transmission unit 723 transmits the automatic control signal to the vehicle 10 as the control target. Therefore, the vehicle control device 15 receives the automatic control signal from the remote automatic control device 7 and drives the actuator by using the automatic control signal, so that the vehicle 10 is autonomously driven without responding to the operation performed by the operator Op on the operator input device 3.

In the period during which the control of the automated driving mode is executed, the remote automatic control device 7 repeatedly executes the acquisition of the position information of the vehicle 10, the decision of the target position, the generation of the automatic control signal, and the transmission the automatic control signal at a predetermined cycle. The vehicle control device 15 repeatedly executes the reception of the automatic control signal and the control of the actuator at a predetermined cycle.

The display control device 8 controls the display contents displayed on the display screen 45. The display control device 8 includes a communication unit 81, a storage unit 83, and a CPU 82. The communication unit 81, the storage unit 83, and the CPU 82 in the display control device 8 are connected to each other, for example, via an internal bus.

The communication unit 81 of the display control device 8 connects another device other than the display control device 8, and the display control device 8 in a communicable manner. The communication unit 81 of the display control device 8 is, for example, a wireless communication device.

The storage unit 83 of the display control device 8 stores various kinds of information including various programs P8 for controlling the operation of the display control device 8. The storage unit 83 of the display control device 8 includes, for example, a RAM, a ROM, and a hard disk drive (HDD).

The CPU 82 of the display control device 8 functions as a mounting acquisition unit 821, an image quality acquisition unit 822, and a display controller 823 by loading various programs P8 stored in the storage unit 83.

The mounting acquisition unit 821 acquires mounting information. The mounting information is information indicating whether or not the mounted camera 16 is mounted in the vehicle 10 as the control target.

The image quality acquisition unit 822 acquires image quality information. The image quality information is information indicating an image quality of an image (hereinafter, a mounted camera image) acquired by the mounted camera 16 mounted in the vehicle 10 as the control target. The image quality of the mounted camera image is determined by at least any one of a resolution of the mounted camera image, a distortion of the mounted camera image, and a detection range (angle of view) of the mounted camera 16 mounted in the vehicle 10 as the control target. The resolution of the mounted camera image is calculated, for example, by specifying a model number of the mounted camera 16 mounted in the vehicle 10 as the control target and the like, and acquiring information (hereinafter, performance information) indicating the performance of the mounted camera 16. The resolution of the mounted camera image may be calculated based on the number of pixels, the image size, or the like of the actually acquired mounted camera image. The distortion of the mounted camera image is calculated, for example, by analyzing the actually acquired mounted camera image. The detection range of the mounted camera 16 mounted in the vehicle 10 as the control target is calculated, for example, by specifying the model number or the like of the mounted camera 16 mounted in the vehicle 10 as the control target, and acquiring the performance information.

The image quality of the mounted camera image in the image quality information means the image quality when the display device 4 receives the mounted camera image. When the mounted camera 16 mounted in the vehicle 10 as the control target has a processing function, the image quality of the mounted camera image in the image quality information means an image quality in an image (hereinafter, a processed image) obtained by processing raw data (hereinafter, an original image) acquired by the mounted camera 16 mounted in the vehicle 10 as the control target. The processing function is a function of processing the original image to generate the processed image. The processing function is, for example, a correction function of correcting a distortion of the original image, a noise removal function of removing noise of the original image, and a resolution adjustment function of adjusting a resolution of the original image. In a case where the mounted camera image is transmitted from the mounted camera 16 to the display device 4 via the display control device 8, when the display control device 8 has the processing function, the image quality of the mounted camera image in the image quality information means the image quality of the processed image. The method of evaluating the image quality of the mounted camera image is not limited to the above-described method. The image quality of the mounted camera image may be evaluated by an evaluation index other than a noise amount of the mounted camera image.

The display controller 823 displays at least one of the mounted camera image and the external camera image on the display screen 45. In the present embodiment, the display controller 823 displays at least one of the mounted camera image and the external camera image on the display screen 45 in accordance with the mounting information and the image quality information in a case where the driving mode of the vehicle 10 is switched from the automated driving mode to the remote manual driving mode.

The display controller 823 displays the mounted camera image on the display screen 45 in at least one of a case where the mounted camera 16 is mounted in the vehicle 10 as the control target and a case where the image quality of the mounted camera image is equal to or more than a predetermined criterion. On the other hand, the display controller 823 displays the external camera image on the display screen 45 in at least one of a case where the mounted camera 16 is not mounted in the vehicle 10 as the control target and a case where the image quality of the mounted camera image is less than the criterion.

For example, in a case where the image quality of the mounted camera image is determined by the resolution of the mounted camera image, the display controller 823 determines that the image quality of the mounted camera image is equal to or more than the criterion in a case where the resolution of the mounted camera image is equal to or more than a predetermined resolution threshold value. For example, in a case where the image quality of the mounted camera image is determined by the resolution of the mounted camera image, the distortion of the mounted camera image, and the detection range of the mounted camera 16, the display controller 823 determines that the image quality of the mounted camera image is equal to or more than the criterion in the following case. In this case, the display controller 823 determines that the image quality of the mounted camera image is equal to or more than the criterion in at least any one of a first case, a second case, and a third case. The first case is a case where the resolution of the mounted camera image is equal to or more than the resolution threshold value. The second case is a case where the distortion of the mounted camera image is less than a predetermined distortion threshold value. The third case is a case where the detection range of the mounted camera 16 is equal to or more than a predetermined range threshold value.

In the present embodiment, in a case where the mounted camera 16 is mounted in the vehicle 10 as the control target, and the image quality of the mounted camera image is equal to or more than the criterion, the display controller 823 displays solely the mounted camera image on the display screen 45. On the other hand, in a case where the mounted camera 16 is mounted in the vehicle 10 as the control target, and the image quality of the mounted camera image is less than the criterion, the display controller 823 displays the mounted camera image and the external camera image on the display screen 45. In a case where the mounted camera 16 is not mounted in the vehicle 10 as the control target, the display controller 823 displays the external camera image on the display screen 45.

Figure 4:
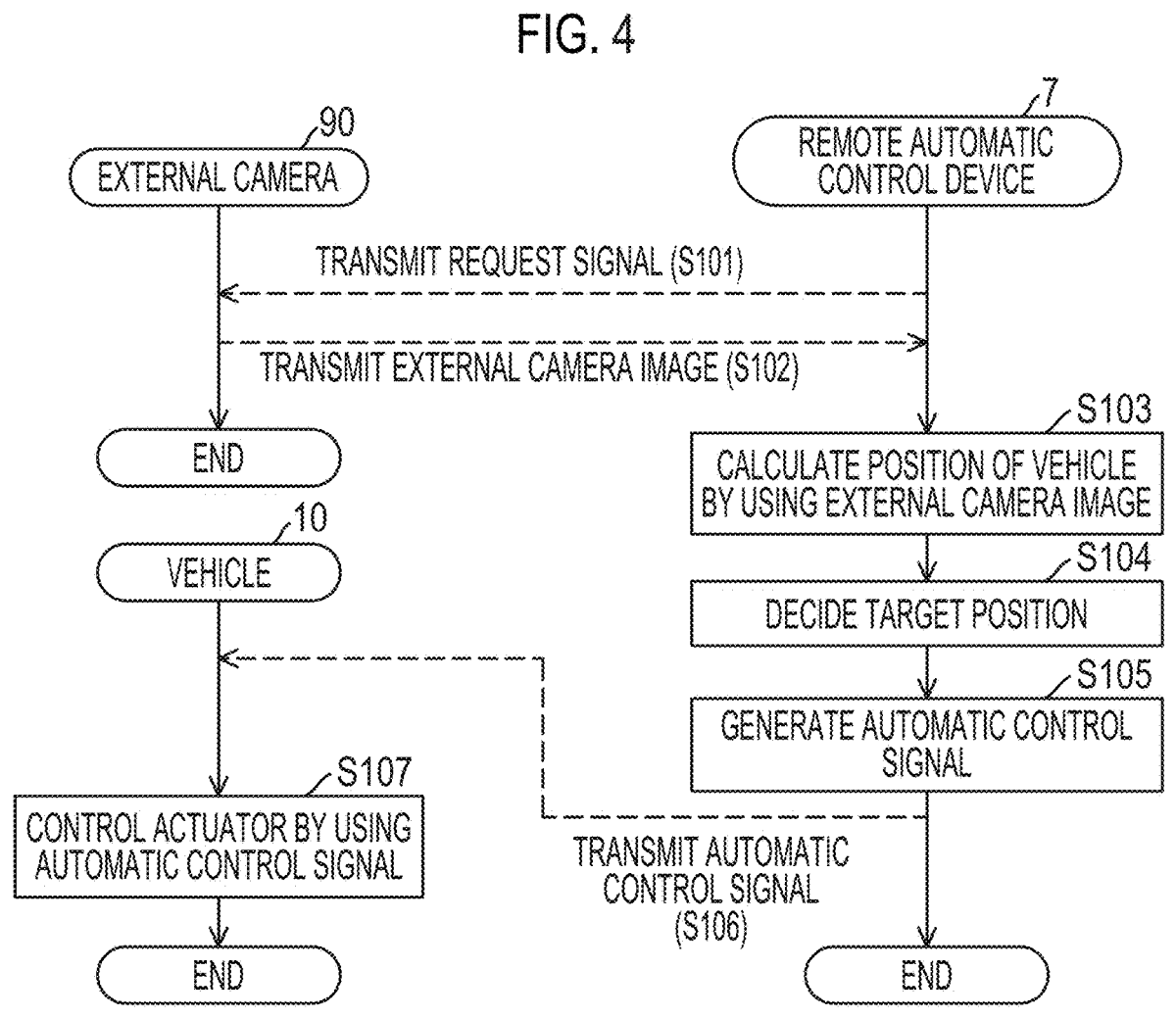

FIG. 4 is a flowchart illustrating an example of an operation control method of the vehicle 10 in the period during which the control of the automated driving mode is executed. The operation control method illustrated in FIG. 4 is repeatedly executed at predetermined time intervals, for example, from a point in time when the vehicle 10 as the control target starts traveling in the automated driving mode to a point in time when the driving mode of the vehicle 10 is switched from the automated driving mode to the remote manual driving mode.

In step S101, the calculation unit 721 of the remote automatic control device 7 transmits a request signal for acquiring the external camera image to the external camera 90. The external camera 90 that has received the request signal transmits the external camera image to the remote automatic control device 7 in step S102. In step S103, the calculation unit 721 of the remote automatic control device 7 calculates the position of the control target vehicle 10 by using the external camera image. In step S104, the automatic signal generation unit 722 decides the target position to which the control target vehicle 10 should head next, by using the position information of the vehicle 10 and the ideal path Ip. In step S105, the automatic signal generation unit 722 generates an automatic control signal for causing the vehicle 10 as the control target to travel toward the decided target position. In step $106, the automatic transmission unit 723 transmits the automatic control signal to the vehicle 10 as the control target. In step S107, the operation controller 153 of the vehicle control device 15 mounted in the vehicle 10 controls the actuator by using the received automatic control signal, to cause the vehicle 10 travel at the acceleration and the steering angle represented by the automatic control signal.

FIG. 5 is a flowchart illustrating a display control method of the display screen 45 in the period during which the control of the remote manual driving mode is executed. The display control method illustrated in FIG. 5 is executed, for example, in a case where the driving mode of the vehicle 10 is switched from the automated driving mode to the remote manual driving mode.

In step S201, the mounting acquisition unit 821 of the display control device 8 acquires the mounting information. In a case where the mounted camera 16 is mounted in the vehicle 10 as the control target (step S202: Yes), the display controller 823 executes step S203. In step S203, the display controller 823 transmits a request signal for acquiring the mounted camera image to the vehicle 10 as the control target. In a case where the vehicle 10 receives the request signal, in step S204, the vehicle transmission unit 154 of the vehicle control device 15 mounted in the vehicle 10 acquires the mounted camera image, and transmits the acquired mounted camera image to the display control device 8. In step S205, the image quality acquisition unit 822 of the display control device 8 acquires the image quality information. In a case where the image quality of the mounted camera image is equal to or more than the criterion (step S206: Yes), in step S207, the display controller 823 transmits the mounted camera image to the display device 4. On the other hand, in a case where the mounted camera 16 is not mounted in the vehicle 10 (step S202: No), and in a case where the image quality of the mounted camera image is less than the criterion (step S206: No), in step S208, the display controller 823 transmits the request signal for acquiring the external camera image to the external camera 90. The external camera 90 that has received the request signal transmits the external camera image to the display control device 8 in step S209. In a case where the mounted camera 16 is mounted in the vehicle 10 as the control target (step S202: Yes), and the image quality of the mounted camera image is less than the criterion (step S206: No), the display controller 823 of the display control device 8 executes step S210. In step S210, the display controller 823 transmits the mounted camera image and the external camera image to the display device 4. In a case where the mounted camera 16 is not mounted in the vehicle 10 (step S202: No), the display controller 823 executes step S211. In step S211, the display control device 8 transmits the external camera image to the display device 4. In step S212, the display device 4 displays the received image on the display screen 45.

FIG. 6 is a flowchart illustrating an operation control method of the vehicle 10 in the period during which the control of the remote manual driving mode is executed. The operation control method illustrated in FIG. 6 is repeatedly executed at predetermined time intervals, for example, from a point in time when the vehicle 10 as the control target starts traveling in the remote manual driving mode to a point in time when the driving mode of the vehicle 10 is switched from the remote manual driving mode to the automated driving mode.

In step S301, the operator input device 3 receives the input of the operator Op. In step S302, the operator input device 3 transmits an operation amount of each input operation unit 30 to the remote manual control device 6. In step S303, the manual signal generation unit 621 of the remote manual control device 6 generates the manual control signal. In step S304, the manual transmission unit 622 transmits the manual control signal to the vehicle 10 as the control target. In step S305, the operation controller 153 of the vehicle control device 15 mounted in the vehicle 10 controls the actuator by using the received manual control signal, to cause the vehicle 10 travel at the acceleration and the steering angle represented by the manual control signal.

According to the first embodiment, the display control device 8 can display the image acquired by the cameras 16, 90 including at least the surrounding region of the control target vehicle 10 in the detection range RG, on the display screen 45 of the display device 4 disposed at the position that can be visually recognized by the operator Op. That is, in a case where the vehicle 10 is remotely controlled by via the operator Op operating the operator input device 3, the display control device 8 can provide the image indicating the surrounding situation of the vehicle 10 to the operator Op. Therefore, the operator Op can operate the operator input device 3 while visually recognizing the image displayed on the display screen 45.

According to the first embodiment, the display control device 8 can recognize whether or not the mounted camera 16 is mounted in the vehicle 10 as the control target by acquiring the mounting information. Therefore, the display control device 8 can display the mounted camera image on the display screen 45 by acquiring the mounted camera image from the control target vehicle 10 in a case where the mounted camera 16 is mounted in the control target vehicle 10. The landscape represented by the mounted camera image acquired by the mounted camera 16 attached to the front side of the vehicle 10 is close to a landscape of a front side of the vehicle 10 as the control target viewed from a driver's seat of the vehicle 10. Therefore, by displaying the mounted camera image on the display screen 45, the input system 2 can reproduce a situation close to a situation in which a driver who gets in the vehicle 10 as the control target operates the steering wheel or the like mounted in the vehicle 10. In this way, in a case where the vehicle 10 is remotely controlled by the operator Op operating the operator input device 3, the display control device 8 can easily allow the operator Op to recognize an object or the like existing around the vehicle 10. That is, the display control device 8 can create a state in which the operator Op can easily operate the operator input device 3. Therefore, the possibility that the vehicle 10 collides with another object or deviates from the path on which the vehicle 10 should travel due to the operation error of the operator Op can be reduced.

According to the first embodiment, in a case where the mounted camera 16 is not mounted in the vehicle 10 as the control target, the display control device 8 can display the external camera image on the display screen 45 by acquiring the external camera image from the external camera 90. Therefore, even in a case where the mounted camera 16 is not mounted in the vehicle 10, the operator Op can operate the operator input device 3 by using the external camera image.

According to the first embodiment, the display control device 8 can acquire the image quality information and compare the image quality information with the predetermined criterion to determine whether or not the image quality of the mounted camera image is equal to or more than the criterion. Therefore, the display control device 8 can display the mounted camera image on the display screen 45 by acquiring the mounted camera image from the vehicle 10 as the control target in a case where the image quality of the mounted camera image is equal to or more than the criterion. In this way, the display control device 8 can display the image with ensured visibility on the display screen 45. Therefore, in a case where the vehicle 10 is remotely controlled by the operator Op operating the operator input device 3, the display control device 8 can easily allow the operator Op to recognize the object or the like existing around the vehicle 10. Therefore, the possibility that the vehicle 10 collides with another object or deviates from the path on which the vehicle 10 should travel due to the operation error of the operator Op can be further reduced.

According to the first embodiment, even in a case where the mounted camera 16 is mounted in the vehicle 10 as the control target, the display control device 8 can display the external camera image on the display screen 45 in addition to the mounted camera image in a case where the image quality of the mounted camera image is less than the criterion. In this way, the display control device 8 can display the display screen 45 in a state where a portion that is difficult to be visually recognized in the mounted camera image is supplemented with the external camera image. Therefore, the operator Op can operate the operator input device 3 while visually recognizing both the mounted camera image and the external camera image to supplement the portion that is difficult to be visually recognized in the mounted camera image with the visually recognized external camera image.

According to the first embodiment, the image quality of the mounted camera image can be determined by at least any one of the resolution of the mounted camera image, the distortion of the mounted camera image, and the detection range of the mounted camera 16 that acquires the mounted camera image. Therefore, the image quality of the mounted camera image can be easily evaluated.

According to the first embodiment, in a case where the image quality of the mounted camera image is determined by the resolution and the distortion of the mounted camera image, the display control device 8 can display the mounted camera image and the external camera image on the display screen 45 in a case where the image quality of the mounted camera image is less than the criterion. In this way, even in a case where the mounted camera image is unclear or distorted and is difficult to be visually recognized, the display control device 8 can allow the operator Op to operate the operator input device 3 by displaying the external camera image on the display screen 45. Therefore, a situation in which the operator input device 3 cannot be operated by the operator Op due to the image quality of the mounted camera image can be avoided. Further, in a case where the image quality of the mounted camera image is determined by the detection range of the mounted camera 16 that acquires the mounted camera image, the display control device 8 can display the mounted camera image and the external camera image on the display screen 45 in a case where the image quality of the mounted camera image is less than the criterion. In this way, a situation in which the operation of the operator input device 3 is hindered or the other object other than the vehicle 10 as the control target is likely to collide with the vehicle 10 due to the fact that the detection range of the mounted camera 16 is narrower than a desired detection range can be avoided.

According to the first embodiment, the display control device 8 can display at least one of the mounted camera image and the external camera image on the display screen 45 in accordance with the mounting information and the image quality information in a case where the automated driving mode is switched to the remote manual driving mode. In this way, the display control device 8 can provide the image indicating the surrounding situation of the vehicle 10 to the operator Op in the period during which the control of the remote manual driving mode is executed.

According to the first embodiment, the traveling system 1 can cause the vehicle 10 to travel via the remote control within the factory. Therefore, the traveling system 1 can move the vehicle 10 within the factory without using transport equipment, such as a crane or a belt conveyor.

B. Second Embodiment

FIG. 7 is a diagram illustrating a configuration of a traveling system 1*a* in a second embodiment. The traveling system 1*a* includes a vehicle 10*a* as one or more moving objects, the external camera 90, the input system 2, and an information processing system 5*a*. The traveling system 1*a* according to the present embodiment is different from the first embodiment in that the remote automatic control device 7 is not provided. That is, the information processing system 5*a* includes the remote manual control device 6 and the display control device 8 without including the remote automatic control device 7. Therefore, a vehicle control device 15*a* mounted in the vehicle 10*a* decides a target position to which the vehicle 10*a* should head next, and generates the automatic control signal for causing the vehicle 10*a* to travel toward the decided target position. That is, the vehicle 10*a* has an autonomous driving mode in which the vehicle 10*a* autonomously executes the decision of the target position and the generation of the automatic control signal, as the automated driving mode in which the vehicle 10*a* travels by using the automatic control signal generated without responding to the operation performed by the operator Op.

The vehicle control device 15*a* includes an input and output interface 159, a storage unit 157*a*, and a CPU 150*a*. The storage unit 157*a* of the vehicle control device 15*a* stores various kinds of information including various programs P15*a* for controlling the operations of the vehicle control device 15*a*, the detection model Md, and the ideal path Ip. The CPU 150*a* of the vehicle control device 15*a* functions as the calculation unit 151, the automatic signal generation unit 152, the operation controller 153, and the vehicle transmission unit 154 by loading various programs P15*a* stored in the storage unit 157*a*. The calculation unit 151 calculates a position of the vehicle 10*a* by using the external camera image, in the same manner as the calculation unit 721 in the first embodiment. The automatic signal generation unit 152 decides the target position to which the vehicle 10*a* should head next, by using the calculated position information of the vehicle 10*a* and the ideal path Ip stored in advance in the storage unit 157*a* of the vehicle control device 15*a*. Then, the automatic signal generation unit 722 generates the automatic control signal for causing the vehicle 10*a* to travel toward the decided target position. The operation controller 153 controls the actuator by using the generated automatic control signal, to cause the vehicle 10*a* to travel at the acceleration and the steering angle represented by the automatic control signal. In a period during which control of the autonomous driving mode is executed, the vehicle control device 15*a* repeatedly executes the acquisition of the position information of the vehicle 10*a*, the decision of the target position, the generation of the automatic control signal, and the control of the actuator at a predetermined cycle. The same components as the components in the first embodiment are denoted by the same reference numerals.

Figure 8:
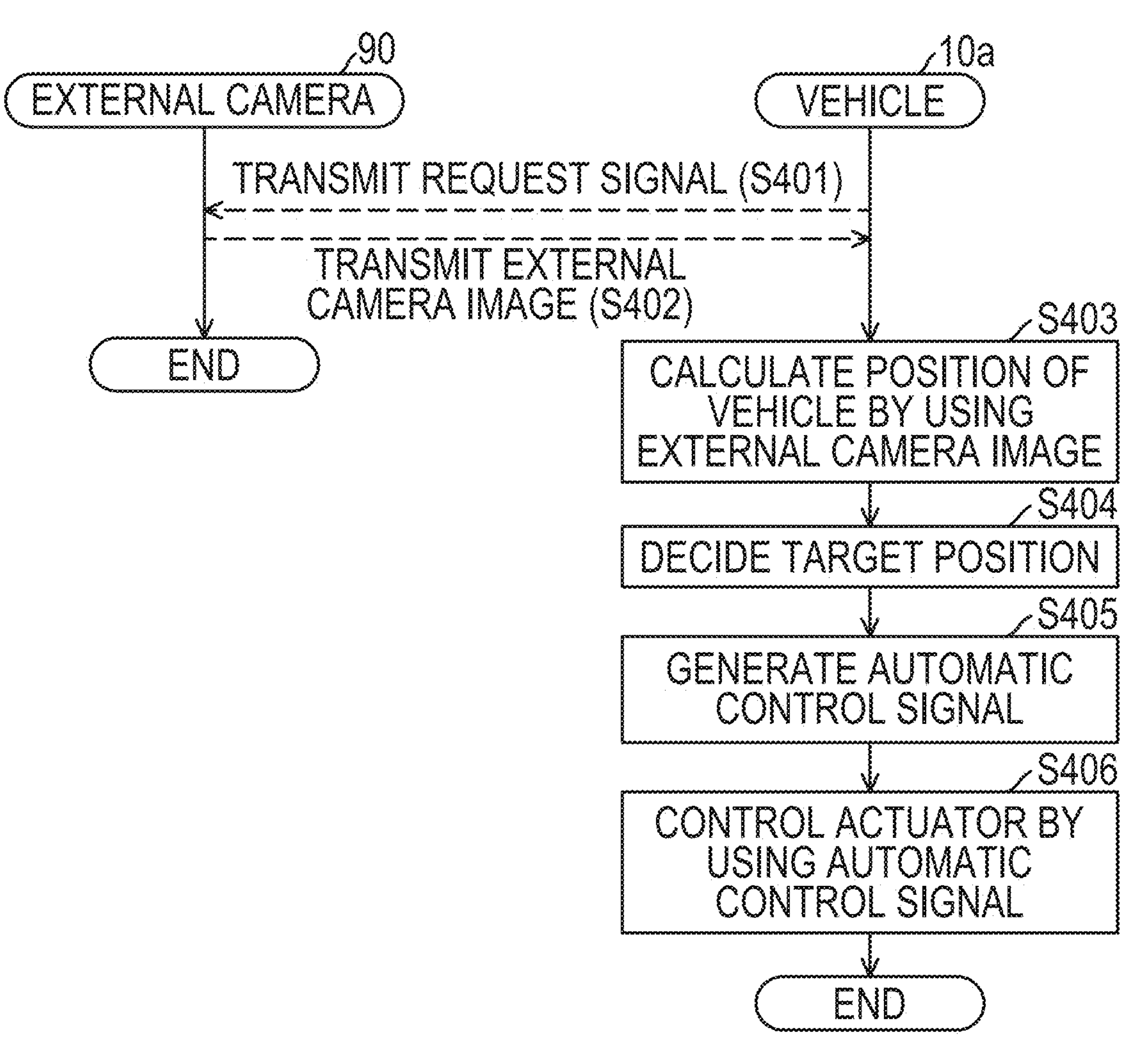
FIG. 8 is a flowchart illustrating an operation control method of a vehicle in an autonomous driving mode.

FIG. 8 is a flowchart illustrating an example of an operation control method of the vehicle 10*a* in a period during which the control of the autonomous driving mode is executed. The operation control method illustrated in FIG. 8 is repeatedly executed at predetermined time intervals, for example, from a point in time when the vehicle 10*a* as the control target starts traveling in the autonomous driving mode to a point in time when the driving mode of the vehicle 10*a* is switched from the autonomous driving mode to the remote manual driving mode.

In step S401, the calculation unit 151 of the vehicle control device 15*a* mounted in the vehicle 10*a* transmits the request signal for acquiring the external camera image to the external camera 90. The external camera 90 that has received the request signal transmits the external camera image to the vehicle 10*a* in step S402. In step S403, the calculation unit 151 of the vehicle control device 15*a* mounted in the vehicle 10*a* calculates the position of the vehicle 10*a* as the control target, by using the external camera image. In step S404, the automatic signal generation unit 152 decides the target position to which the vehicle 10*a* as the control target should head next, by using the position information of the vehicle 10*a* and the ideal path Ip. In step S405, the automatic signal generation unit 152 generates the automatic control signal for causing the vehicle 10*a* to travel toward the decided target position. In step S406, the operation controller 153 controls the actuator by using the automatic control signal, to cause the vehicle 10*a* to travel at the acceleration and the steering angle represented by the automatic control signal.

According to the second embodiment, the traveling system 1*a* can autonomously drive the vehicle 10*a*. Therefore, the traveling system 1*a* can move the vehicle 10*a* without using transport equipment, such as a crane or a belt conveyor.

The calculation unit 151 may be a single function of another device other than the remote automatic control device 7, such as the external camera 90. In this case, the vehicle control device 15*a* of the vehicle 10*a* includes an acquisition unit that acquires the position information of the vehicle 10*a*, instead of the calculation unit 151.

C. Other Embodiments

C-1. Other Embodiment 1

The display control device 8 may include the mounting acquisition unit 821 without including the image quality acquisition unit 822. In this case, in a case where the mounted camera 16 is mounted in the vehicles 10, 10*a* as the control targets, the display controller 823 displays the mounted camera image on the display screen 45 regardless of whether or not the image quality of the mounted camera image is equal to or more than the criterion. The display control device 8 may include the image quality acquisition unit 822 without including the mounting acquisition unit 821. In this case, the image quality acquisition unit 822 determines that the mounted camera 16 is mounted in the vehicles 10, 10*a* as the control targets in a case where the image quality information can be acquired. Then, in a case where the image quality of the mounted camera image is equal to or more than the criterion, the display controller 823 displays the mounted camera image on the display screen 45. In a case where the image quality acquisition unit 822 can acquire the image quality information, and the image quality of the mounted camera image is less than the criterion, the display controller 823 displays the mounted camera image and the external camera image on the display screen 45. Even in such a form, the display controller 823 can display at least one of the mounted camera image and the external camera image on the display screen 45 in accordance with any one of the mounting information and the image quality information.

C-2. Other Embodiment 2

The display controller 823 may display at least one of the mounted camera image and the external camera image on the display screen 45 in accordance with the mounting information and the image quality information in a case where the switching from the automated driving mode to the remote manual driving mode is predicted. For example, the display controller 823 may display at least one of the mounted camera image and the external camera image on the display screen 45 in response to the prediction that the automated driving mode is switched to the remote manual driving mode. In such a form, the display control device 8 can display at least one of the mounted camera image and the external camera image on the display screen 45 in accordance with the mounting information and the image quality information in a case where the switching from the automated driving mode to the remote manual driving mode is predicted. In this way, the display controller 823 can display at least one of the mounted camera image and the external camera image on the display screen 45 before the automated driving mode is switched to the remote manual driving mode. Therefore, in a case where the automated driving mode is switched to the remote manual driving mode, the operator Op can visually recognize the image displayed on the display screen 45 and start the operation of the operator input device 3 promptly. In a case where the vehicles 10, 10*a* are unexpectedly stopped in the period during which the control of the automated driving mode is executed, and the automated driving mode is switched to the remote manual driving mode, a time for which the vehicles 10, 10*a* are unexpectedly stopped can be minimized.

C-3. Other Embodiment 3

The display controller 823 may display at least one of the mounted camera image and the external camera image on the display screen 45 in accordance with the mounting information and the image quality information in a case other than a case where the automated driving mode is switched to the remote manual driving mode is predicted and a case where the switching from the automated driving mode to the remote manual driving mode is predicted. For example, the display controller 823 may display at least one of the mounted camera image and the external camera image on the display screen 45 in accordance with the mounting information and the image quality information even in the period during which the control of the automated driving mode is executed. In such a form, in a case where there is the need to switch from the automated driving mode to the remote manual driving mode, the operator Op can visually recognize the image displayed on the display screen 45 and operate the operator input device 3 more promptly. Further, the operator Op can appropriately check a traveling situation of the vehicles 10, 10*a* in the period during which the control of the automated driving mode is executed.

C-4. Other Embodiment 4

The traveling system 1 may detect a region outside the detection range of the mounted camera 16 in the surrounding region of the vehicles 10, 10*a*, via the external camera 90. Then, in a case where the display controller 823 displays the mounted camera image on the display screen 45, the display controller 823 may display the external camera image on the display screen 45 in addition to the mounted camera image. That is, in a case where the image quality of the mounted camera image is equal to or more than the criterion or a case where the mounted camera image is uniformly displayed on the display screen 45 regardless of whether or not the image quality of the mounted camera image is equal to or more than the criterion, the display controller 823 may display the mounted camera image and the external camera image on the display screen 45. In such a form, the operator Op can visually recognize the situation of the region that cannot be visually recognized with the mounted camera image by using the external camera image. Therefore, a blind spot that occurs in the surrounding region of the vehicles 10, 10*a* can be reduced in a case where the operator Op operates the operator input device 3 by using the image displayed on the display screen 45.

C-5. Other Embodiment 5

The vehicles 10, 10*a* may include a plurality of the mounted cameras 16. In this case, each of the mounted cameras 16 is attached to the vehicles 10, 10*a* with, for example, the smaller overlap between the detection ranges of the adjacent mounted cameras 16. The display control device 8 displays the mounted camera images respectively acquired by the mounted cameras 16 on the display screen 45. In such a form, the possibility that the blind spot occurs in the surrounding region of the vehicles 10, 10*a* can be reduced in a case where the operator Op operates the operator input device 3 by using the image displayed on the display screen 45 as compared with a case where one mounted camera 16 is provided in the vehicles 10, 10*a*. In addition, in a case where four mounted cameras 16 are provided in the vehicles 10, 10*a*, the mounted cameras 16 may be respectively attached to, for example, a front side, a rear side, a right side, and a left side of the vehicles 10, 10*a*. The landscape represented by the mounted camera image acquired by the mounted camera 16 attached to the rear side of the vehicles 10, 10*a* is close to a landscape of a rear side of the vehicles 10, 10*a* as the control targets viewed from the driver's seat of the vehicles 10, 10*a*. The landscape represented by the mounted camera image acquired by the mounted camera 16 attached to the right side of the vehicles 10, 10*a* is close to a landscape of a right side of the vehicles 10, 10*a* as the control targets viewed from the driver's seat of the vehicles 10, 10*a*. The landscape represented by the mounted camera image acquired by the mounted camera 16 attached to the left side of the vehicles 10, 10*a* is close to a landscape of a left side of the vehicles 10, 10*a* as the control targets viewed from the driver's seat of the vehicles 10, 10*a*. Therefore, the mounted camera images respectively acquired by the mounted cameras 16 attached to the front side, the rear side, the right side, and the left side of the vehicles 10, 10*a* are displayed on the display screen 45, so that the landscape can be brought closer to the landscape viewed from the driver's seat.

C-6. Other Embodiment 6

The traveling system 1 may detect the surrounding region of the vehicles 10, 10*a* via the external cameras 90. The display controller 823 may display the external camera images respectively acquired by the external cameras 90 on the display screen 45. In such a form, the display controller 823 can display the external camera images in which the surrounding region of the vehicles 10, 10*a* as the control targets is detected from different directions, on the display screen 45. Therefore, a blind spot that occurs in the surrounding region of the vehicles 10, 10*a* can be reduced in a case where the operator Op operates the operator input device 3 by using the image displayed on the display screen 45.

C-7. Other Embodiment 7

The display control device 8 may further include a communication information acquisition unit that acquires communication information. The communication information is information indicating whether or not the vehicles 10, 10*a* as the control targets can transmit the mounted camera image to the display control device 8. In this case, in a case where the vehicles 10, 10*a* as the control targets can transmit the mounted camera image to the display control device 8, the display control device 8 acquires the image quality information or displays the mounted camera image on the display screen 45. On the other hand, in a case where the vehicles 10, 10*a* as the control targets cannot transmit the mounted camera image to the display control device 8, the display control device 8 displays the external camera image on the display screen 45. In such a form, in a case where the display controller 823 cannot transmit the mounted camera image to the display control device 8 due to a communication load or the like, the display controller 823 can display the external camera image on the display screen 45.

C-8. Other Embodiment 8

At least any of the remote manual control device 6, the remote automatic control device 7, and the display control device 8 may be integrally configured. In addition, each unit of the remote manual control device 6, the remote automatic control device 7, and the display control device 8 may be implemented by cloud computing in which, for example, one or more computers are used. In such a form, the configurations of the remote manual control device 6, the remote automatic control device 7, and the display control device 8 can be changed as appropriate.

C-9. Other Embodiment 9

In the first embodiment, the processing from the acquisition of the position information of the vehicle 10 to the generation of the traveling control signal is executed by the remote automatic control device 7. Meanwhile, the vehicle 10 may execute at least a part of the processing from the acquisition of the position information of the vehicle 10 to the generation of the automatic control signal. For example, the following forms (1) to (3) may be used.

(1) The remote automatic control device 7 may acquire the position information of the vehicle 10, decide the target position to which the vehicle 10 should head next, and generate a path from the current position of the vehicle 10 represented by the acquired position information to the target position. The remote automatic control device 7 may generate a path to the target position between the current position and the destination, or may generate a path to the destination. The remote automatic control device 7 may transmit the generated path to the vehicle 10. The vehicle 10 may generate the automatic control signal for causing the vehicle 10 to travel on the path received from the remote automatic control device 7, and control the actuator by using the generated automatic control signal.

(2) The remote automatic control device 7 may acquire the position information of the vehicle 10, and transmit the acquired position information to the vehicle 10. The vehicle 10 may decide the target position to which the vehicle 10 should head next, generate the path from the current position of the vehicle 10 represented by the received position information to the target position, generate the automatic control signal for causing the vehicle 10 to travel on the generated path, and control the actuator by using the generated automatic control signal.

(3) In the forms (1) and (2), an internal sensor Si may be mounted in the vehicle 10, and a detection result output from the internal sensor Si may be used for at least one of the generation of the path and the generation of the automatic control signal. Examples of the internal sensor Si include the mounted camera 16, a mounted LiDAR, a millimeter wave radar, an ultrasound sensor, a GPS sensor, an acceleration sensor, and a gyro sensor. For example, in the form (1), the remote automatic control device 7 may acquire the detection result of the internal sensor Si, and reflect the detection result of the internal sensor Si in the path when the path is generated. In the form (1), the vehicle 10 may acquire the detection result of the internal sensor Si, and reflect the detection result of the internal sensor Si in the automatic control signal when the automatic control signal is generated. In the form (2), the vehicle 10 may acquire the detection result of the internal sensor Si, and reflect the detection result of the internal sensor Si in the path when the path is generated. In the form (2), the vehicle 10 may acquire the detection result of the internal sensor Si, and reflect the detection result of the internal sensor Si in the automatic control signal when the automatic control signal is generated.

(4) In the second embodiment, the internal sensor Si may be mounted in the vehicle 10*a*, and the detection result output from the internal sensor Si may be used for at least one of the generation of the path and the generation of the automatic control signal. For example, the vehicle 10*a* may acquire the detection result of the internal sensor Si, and reflect the detection result of the internal sensor Si in the path when the path is generated. The vehicle 10*a* may acquire the detection result of the internal sensor Si, and reflect the detection result of the internal sensor Si in the automatic control signal when the automatic control signal is generated.

(5) In the second embodiment, the vehicle 10*a* acquires the position information of the vehicle 10*a* by using the detection result of the external sensor Sc. Meanwhile, the internal sensor Si may be mounted in the vehicle 10*a*, and the vehicle 10*a* may acquire the position information by using the detection result of the internal sensor Si, decide the target position to which the vehicle 10*a* should head next, generate the path from the current position of the vehicle 10*a* represented by the acquired position information to the target position, generate the automatic control signal for causing the vehicle 10*a* to travel on the generated path, and control the actuator by using the generated automatic control signal. In this case, the vehicle 10*a* can travel without using the detection result of the external sensor Se at all. The vehicle 10*a* may acquire a target arrival time or traffic jam information from the outside of the vehicle 10*a*, and reflect the target arrival time or the traffic jam information in at least one of the path and the automatic control signal. In addition, the functional configurations of the traveling systems 1, 1*a* may be provided in the vehicles 10, 10*a*. That is, the processing implemented by the traveling systems 1, 1*a*, such as the traveling control of the vehicles 10, 10*a* and the display control of the display device 4 described in the present disclosure, may be implemented solely by the vehicles 10, 10*a*.

C-10. Other Embodiment 10

The calculation units 151, 721 may calculate the position and the orientation of the vehicles 10, 10*a* by using the sensor information acquired by the sensor of a different kind from the external camera 90. The calculation units 151, 721 may calculate, for example, the position and the orientation of the vehicles 10, 10*a* by using measurement point group data that represents the appearance shape of the vehicles 10, 10*a* in three dimensions, the measurement point group data being acquired by a light detection and ranging (LiDAR) (hereinafter, referred to as an external LiDAR) as the external sensor Se. In this case, the calculation units 151, 721 calculate the position and the orientation of the vehicles 10, 10*a*, for example, by matching the measurement point group data with point group data for reference. The point group data for reference is reference data used as a template in the matching with the measurement point group data. The point group data for reference is, for example, virtual three-dimensional point group data generated based on three-dimensional CAD data representing the appearance shape of the vehicles 10, 10*a*. An algorithm for the matching via the calculation units 151, 721 includes, for example, an iterative closest point (ICP) and a normal distributions transform (NDT). The calculation units 151, 721 may calculate the position and the orientation of the vehicles 10, 10*a* by using the measurement point group data acquired by detecting the vehicles 10, 10*a* as calculation targets via a mounted LiDAR mounted in other vehicles 10, 10*a* different from the vehicles 10, 10*a* as the calculation targets.

C-11. Other Embodiment 11

The manual signal generation unit 621 may obtain the manual control signal by executing processing of uniformly multiplying an operation amount corresponding to each input operation unit 30 of the operator input device 3, that is, the operation amount corresponding to each element, such as the acceleration and the steering angle that define the traveling operation of the vehicles 10, 10*a* by a predetermined constant. Specifically, in a case where the manual control signal includes the acceleration and the steering angle of the vehicles 10, 10*a* as the parameters, the manual signal generation unit 621 uniformly multiplies the operation amount of each of the steering wheel 31, the accelerator pedal 32, and the brake pedal 33 of the operator input device 3 by the predetermined constant. Then, the manual signal generation unit 621 generates the manual control signal such that the acceleration of the vehicles 10, 10*a* becomes a value obtained by multiplying the operation amounts of the accelerator pedal 32 and the brake pedal 33 of the operator input device 3 by the constant. The manual signal generation unit 621 generates the manual control signal such that the steering angle of the vehicles 10, 10*a* becomes a value obtained by multiplying the operation amount of the steering wheel 31 of the operator input device 3 by the constant. In such a form, when an upper limit value and a lower limit value of an output value of the operator input device 3 and an upper limit value and a lower limit value of an output value of the actuator, such as the drive device 11 of the vehicles 10, 10*a*, are different from each other, the manual control signal can be generated corresponding to an output possible range of the actuator of the vehicles 10, 10*a* on a reception side.

C-12. Other Embodiment 12

The manual signal generation unit 621 may provide an upper limit value for each element that defines the traveling operation of the vehicles 10, 10*a* the operation amount corresponding to each input operation unit 30 of the operator input device 3, that is, the operation amount corresponding to each element, such as the acceleration and the steering angle that define the traveling operation of the vehicles 10, 10*a*. For example, the manual signal generation unit 621 executes the following processing in a case where the manual control signal includes the acceleration and the steering angle of the vehicles 10, 10*a* as the parameters. In this case, in a case where the operation amount of the accelerator pedal 32 of the operator input device 3 is equal to or more than a first upper limit value, the manual signal generation unit 621 generates the manual control signal such that the acceleration of the vehicles 10, 10*a* becomes the first upper limit value. In a case where the operation amount of the steering wheel 31 of the operator input device 3 is equal to or more than a second upper limit value, the manual signal generation unit 621 generates the manual control signal such that the steering angle of the vehicles 10, 10*a* becomes the second upper limit value. In such a form, by providing the upper limit value for each element that defines the traveling operation of the vehicles 10, 10*a*, the traveling operation of the vehicles 10, 10*a* can be avoided from being rapidly changed, such as the vehicles 10, 10*a* being rapidly accelerated or rapidly turned.

C-13. Other Embodiment 13

In each of the above-described embodiments, the vehicles 10, 10*a* need solely have a configuration capable of moving via the unmanned driving, and may have a form of the platform having a configuration described below, for example. Specifically, the vehicles 10, 10*a* need solely include at least the vehicle control devices 15, 15*a*, the drive device 11, the steering device 12, and the braking device 13, in order to exhibit the three functions of "traveling", "turning", and "stopping" via the unmanned driving. In a case where the vehicles 10, 10*a* acquire the information from the outside for the unmanned driving, the vehicles 10, 10*a* need solely further include the communication device 14. That is, the vehicles 10, 10*a* that can be moved via the unmanned driving need not be equipped with at least a part of the interior components, such as a driver's seat and a dashboard, need not be equipped with at least a part of the exterior components, such as a bumper and a fender mirror, and need not be equipped with the bodyshell. In this case, the remaining components, such as the bodyshell, may be equipped in the vehicles 10, 10*a* while the vehicles 10, 10*a* are shipped from the factory, or the remaining components, such as the bodyshell, may be equipped in the vehicles 10, 10*a* after the vehicles 10, 10*a* are shipped from the factory in a state where the remaining components, such as the bodyshell, are not equipped in the vehicles 10, 10*a*. The respective components may be equipped from any direction, such as an upper side, a lower side, a front side, a rear side, a right side, or a left side of the vehicles 10, 10*a*, and may be equipped from the same direction or different directions. The position decision can be made for the form of the platform in the same manner as the vehicles 10, 10*a* in each of the above-described embodiments.

C-14. Other Embodiment 14

The vehicles 10, 10*a* may be manufactured by combining a plurality of modules. The module means a unit configured by a plurality of components assembled depending on the parts or the functions of the vehicles 10, 10*a*. For example, the platforms of the vehicles 10, 10*a* may be manufactured by combining a front module that constitutes a front portion of the platform, a center module that constitutes a center portion of the platform, and a rear module that constitutes a rear portion of the platform. In addition, the number of the modules constituting the platform is not limited to three, and may be two or less or four or more. In addition to or instead of the components constituting the platform, the components constituting the portions of the vehicles 10, 10*a* different from the platform may be modularized. In addition, various modules may include any exterior component, such as a bumper or a grille, or any interior component, such as the seat or a console. In addition, in addition to the vehicles 10, 10*a*, a moving object of any aspect may be manufactured by combining the modules. Such a module may be manufactured, for example, by joining the components via welding or a fastener, or may be manufactured by integrally molding at least a part of the components constituting the module as one component by casting. A molding method of integrally molding one component, particularly a relatively large component, is also called giga casting or mega casting. For example, the front module, the center module, and the rear module may be manufactured by using giga casting.

C-15. Other Embodiment 15

The transport of the vehicles 10, 10*a* by using the traveling of the vehicles 10, 10*a* by the unmanned driving is also referred to as "autonomous transport". A configuration for implementing the autonomous transport is also referred to as "vehicle remote control autonomous driving transport system". A production method of producing the vehicles 10, 10*a* by using the autonomous transport is also referred to as "autonomous production". In the autonomous production, for example, at least a part of the transport of the vehicles 10, 10*a* is implemented by the autonomous transport in the factory in which the vehicles 10, 10*a* are manufactured.

The present disclosure is not limited to the above-described embodiments, and can be implemented with various configurations without departing from the spirit of the present disclosure. For example, the technical features of the embodiments corresponding to the technical features in each form described in the section of SUMMARY can be replaced or combined as appropriate to solve some or all of the above objects, or to achieve some of or all the above effects. In a case where the technical features are not described as necessary in the present specification, the features can be deleted as appropriate.

What is claimed is:

1. A display control device configured to control a display device used to move a moving object configured to move via unmanned driving, wherein:

the moving object is configured to:

receive a traveling control signal that defines a traveling operation of the moving object, and travel in a remote manual driving mode by using the received traveling control signal;

in a period during which control of the remote manual driving mode is executed, the traveling control signal is generated in response to an operation performed by an operator on an operator input device using an image acquired by a camera and displayed on a display screen of the display device provided at a different place from the moving object;

the camera is one of a mounted camera mounted in the moving object or an external camera configured to acquire an external camera image the moving object from an outside;

the operator input device is provided at a different place from the moving object;

the display control device comprises:

memory storing one or more programs;

a processor, wherein the one or more programs, when executed by the processor, causes the display control device to, in the remote manual driving mode:

based on the camera being the mounted camera, acquire image quality information indicating an image quality of a mounted camera image acquired by the mounted camera;

based on the image quality information being acquired, display the mounted camera image on the display screen based on the image quality of the mounted camera image being equal to or more than a predetermined criterion; and based on the camera being the external camera, display the external camera image acquired by the external camera on the display screen based on the mounted camera not being mounted in the moving object, the external camera being provided at a different place from the moving object.

2. The display control device according to claim 1, wherein the image quality is determined by at least one of a resolution of the mounted camera image, a distortion of the mounted camera image, and a detection range of the mounted camera.

3. The display control device according to claim 2, wherein the one or more programs, when executed by the processor, causes the display control device to determine that the image quality of the mounted camera image is equal to or more than the predetermined criterion in at least one of a first case, a second case, and a third case, the first case being a case where the resolution of the mounted camera image is equal to or more than a first threshold value, the second case being a case where the distortion of the mounted camera image is less than a predetermined second threshold value, and the third case being a case where the detection range of the mounted camera is equal to or more than a predetermined third threshold value.

4. The display control device according to claim 1, wherein:

the moving object is further configured to travel in an automated driving mode by using the traveling control signal generated without responding to the operation performed by the operator on the operator input device; and the one or more programs, when executed by the processor, causes the display device to display at least one of the mounted camera image and the external camera image on the display screen in accordance with the mounting information and the image quality information in at least one of a case where the automated driving mode is switched to the remote manual driving mode and a case where the switching from the automated driving mode to the remote manual driving mode is predicted.

5. The display control device according to claim 4, wherein the one or more programs, when executed by the processor, causes the display device to, in the automated driving mode, display at least one of the mounted camera image and the external camera image on the display screen in accordance with the mounting information and the image quality information.

6. The display control device according to claim 1, wherein the one or more programs, when executed by the processor, causes the display device to, when the mounted camera image is displayed on the display screen, display the external camera image on the display screen in addition to the mounted camera image.

7. The display control device according to claim 1, wherein the moving object includes a processing function, and wherein the image quality of the mounted camera image is obtained by processing raw data from the mounted camera via the processing function.

8. The display control device according to claim 1, wherein the external camera is configured to detect a region outside a detection range of the mounted camera.

9. A display device used to move a moving object configured to move via unmanned driving, wherein:

the moving object is configured to:

receive a traveling control signal that defines a traveling operation of the moving object and, and travel in a remote manual driving mode by using the received traveling control signal;

the display device comprises a display screen provided at a different place from the moving object and is configured to display an image acquired by a camera;

in a period during which control of the remote manual driving mode is executed, the traveling control signal is generated in response to an operation performed by an operator on an operator input device using the image displayed on the display screen;

the camera is one of a mounted camera mounted in the moving object or an external camera configured to capture an external camera image the moving object from an outside;

the operator input device is provided at a different place from the moving object;

when the camera is the mounted camera, a mounted camera image acquired by the mounted camera is displayed on the display screen based on an image quality of the mounted camera image being equal to or more than a predetermined criterion; and when the camera is the external camera, the external camera image acquired by the external camera is displayed on the display screen based on the mounted camera not being mounted in the moving object, the external camera being provided at a different place from the moving object.

10. A display control device for controlling a display device, comprising:

memory storing one or more programs;

a processor, wherein the one or more programs, when executed by the processor, causes the display device to:

in a remote manual driving mode, acquire mounting information indicating whether or not a mounted camera is mounted in the moving object, wherein:

the mounted camera is configured to acquire a mounted camera image, and the moving object is configured to:

receive a traveling control signal that defines a traveling operation of the moving object, wherein the traveling control signal is generated based on an operation performed by an operator via an operator input device provided at a different place from the moving object, the operation being performed using an external camera image or the mounted camera image, wherein the external camera image is acquired from an external camera that is provided at a different place from the moving object; and travel in the remote manual driving mode based on the received traveling control signal;

based on the mounting information indicating that the mounted camera is not mounted in the moving object, display the external camera image on a display screen, wherein the display screen is included in the display device and is provided at a different place from the moving object;

based on the mounting information indicating that the mounted camera is mounted in the moving object, acquire image quality information indicating an image quality of the mounted camera image;

based on the image quality being equal to or more than a predetermined criterion, display the mounted camera image on the display screen; and based on the image quality being less than the predetermined criterion, display the external camera image on the display screen.

* * * * *